US012362922B2

(12) United States Patent
Marinet et al.

(10) Patent No.: US 12,362,922 B2
(45) Date of Patent: Jul. 15, 2025

(54) ENCRYPTION AND/OR DECRYPTION KEY DEVICE, SYSTEM AND METHOD

(71) Applicants: STMICROELECTRONICS (ROUSSET) SAS, Rousset (FR); STMICROELECTRONICS BELGIUM, Machelen (BE)

(72) Inventors: Fabrice Marinet, Chateauneuf le Rouge (FR); Michael Peeters, Tourinnes-la-Grosse (BE)

(73) Assignees: STMICROELECTRONICS (ROUSSET) SAS, Rousset (FR); STMICROELECTRONICS BELGIUM, Machelen (BE)

( * ) Notice: Subject to any disclaimer, the term of this patent is extended or adjusted under 35 U.S.C. 154(b) by 89 days.

(21) Appl. No.: 16/824,242

(22) Filed: Mar. 19, 2020

(65) Prior Publication Data
US 2020/0313880 A1 Oct. 1, 2020

(30) Foreign Application Priority Data

Mar. 25, 2019 (FR) ...................................... 1903063

(51) Int. Cl.
*H04L 9/08* (2006.01)
*G06F 9/4401* (2018.01)
(Continued)

(52) U.S. Cl.
CPC .......... *H04L 9/0861* (2013.01); *G06F 9/4401* (2013.01); *H04L 9/0894* (2013.01);
(Continued)

(58) Field of Classification Search
CPC ... H04L 9/0861; H04L 9/0825; H04L 9/0891; H04L 9/0897; H04L 9/3247;
(Continued)

(56) References Cited

U.S. PATENT DOCUMENTS 7,363,499 B2 * 4/2008 Perlman ................ H04L 9/3006
713/176
7,409,545 B2 * 8/2008 Perlman .................. H04L 9/088
380/278

(Continued)

FOREIGN PATENT DOCUMENTS

CN 101086707 A * 12/2007 ........... G06F 21/556
CN 100423041 C * 10/2008 ............. G06F 21/10
(Continued)

OTHER PUBLICATIONS

Wu et al, "Dynamic Keys Based Sensitive Information System," The $9^{th}$ International Conference for Young Computer Scientists, *IEEE Computer Society*, 2008, pp. 1895-1901.

*Primary Examiner* — Ali H. Cheema
(74) *Attorney, Agent, or Firm* — Seed IP Law Group LLP

(57) ABSTRACT

An electronic device includes processing circuitry and one or more memories, including a non-volatile memory. Ephemeral cryptographic key generation circuitry, in operation, applies a function to code stored in the non-volatile memory, generating an ephemeral cryptographic key. Cryptographic circuitry coupled between the processing circuitry and the one or more memories, in operation, performs one or more cryptographic operations on data using the generated ephemeral cryptographic key. The device may include a register, which, in operation, temporarily stores the generated ephemeral cryptographic key.

15 Claims, 2 Drawing Sheets

(51) Int. Cl.
*H04L 9/14* (2006.01)
*G06F 21/57* (2013.01)
*G06F 21/60* (2013.01)
*G06F 21/79* (2013.01)

(52) U.S. Cl.
CPC .............. *H04L 9/14* (2013.01); *G06F 21/575* (2013.01); *G06F 21/602* (2013.01); *G06F 21/79* (2013.01)

(58) Field of Classification Search
CPC ....... H04L 9/0894; H04L 9/14; H04L 9/0816; H04L 63/0442; H04L 9/08; H04L 9/32; G06F 21/575; G06F 21/602; G06F 21/79; G06F 21/31; G06F 9/4401; G06F 21/60; G06F 21/57
USPC .......... 380/44, 278; 713/164, 170, 171, 176, 713/178, 192, 2, 188
See application file for complete search history.

(56) References Cited

U.S. PATENT DOCUMENTS

| | | | | |
|---|---|---|---|---|
| 8,555,082 | B1 * | 10/2013 | Bibikar | G06F 21/575 713/189 |
| 9,274,976 | B2 * | 3/2016 | Farrugia | G06F 12/1408 |
| 9,396,335 | B2 * | 7/2016 | Jaber | G06F 21/575 |
| 10,540,207 | B1 * | 1/2020 | Lorenz | G06F 9/5027 |
| 10,565,382 | B1 * | 2/2020 | Diamant | H04L 9/0897 |
| 10,735,200 | B2 * | 8/2020 | Davoust | H04L 9/0836 |
| 2002/0049909 | A1 * | 4/2002 | Jackson | G06Q 20/3674 713/188 |
| 2006/0179302 | A1 * | 8/2006 | Hatakeyama | H04L 9/3236 713/164 |
| 2007/0079112 | A1 * | 4/2007 | Lewis | G06F 21/575 713/2 |
| 2007/0288740 | A1 * | 12/2007 | Dale | G06F 9/4405 713/2 |
| 2011/0258452 | A1 * | 10/2011 | Coulier | H04L 9/3242 713/171 |
| 2012/0072734 | A1 * | 3/2012 | Wishman | G06F 21/64 713/189 |
| 2013/0042111 | A1 * | 2/2013 | Fiske | H04L 9/3239 713/170 |
| 2013/0091345 | A1 * | 4/2013 | Shroff | G06F 21/00 713/2 |
| 2013/0219189 | A1 | 8/2013 | Simmons | |
| 2014/0089617 | A1 | 3/2014 | Polzin et al. | |
| 2015/0026471 | A1 * | 1/2015 | Cha | G06F 21/57 713/168 |
| 2015/0058612 | A1 * | 2/2015 | Arora | H04L 9/0863 713/190 |
| 2015/0067786 | A1 * | 3/2015 | Fiske | H04W 12/06 726/4 |
| 2015/0188715 | A1 * | 7/2015 | Castellucci | H04L 9/3297 713/178 |
| 2016/0156464 | A1 * | 6/2016 | Naslund | H04L 63/061 713/171 |
| 2016/0171223 | A1 * | 6/2016 | Covey | G06F 9/4401 713/189 |
| 2016/0380766 | A1 * | 12/2016 | Jablonski | H04L 9/3033 380/44 |
| 2017/0104580 | A1 * | 4/2017 | Wooten | G06F 8/65 |
| 2017/0359717 | A1 * | 12/2017 | Adler | H04L 9/0891 |
| 2019/0147192 | A1 * | 5/2019 | Khosravi | H04L 9/0894 713/192 |
| 2019/0163909 | A1 * | 5/2019 | Schilder | H04L 9/0822 |
| 2020/0175170 | A1 * | 6/2020 | Diamant | H04L 9/3234 |
| 2020/0226952 | A1 * | 7/2020 | Lightowler | H04L 9/0637 |
| 2020/0228330 | A1 * | 7/2020 | Zhuang | H04L 9/3297 |
| 2020/0266999 | A1 * | 8/2020 | Schwarz | H04L 9/3242 |

FOREIGN PATENT DOCUMENTS

| | | | | |
|---|---|---|---|---|
| CN | 103700177 | A | 4/2014 | |
| CN | 103119553 | B * | 12/2016 | .......... G06F 21/572 |
| CN | 106487503 | B * | 7/2021 | .......... H04L 63/0442 |
| EP | 2482222 | B1 * | 11/2016 | ......... G06F 12/1027 |
| FR | 3020888 | A1 * | 11/2015 | .......... H04L 9/0822 |
| JP | 2004140668 | A * | 5/2004 | .......... H04L 9/0836 |
| JP | 2006018528 | A * | 1/2006 | .......... G06F 21/575 |
| JP | 2010514000 | A * | 4/2010 | .......... G06F 21/305 |
| JP | 4719950 | B2 * | 7/2011 | |
| JP | 5623657 | B2 | 11/2014 | |
| KR | 20080096054 | A * | 10/2008 | ......... G06F 21/6209 |
| KR | 20180007717 | A * | 1/2018 | .......... G06F 21/575 |
| WO | WO-2008142633 | A1 * | 11/2008 | .......... G06F 12/14 |
| WO | WO-2014175900 | A1 * | 10/2014 | .............. G06F 21/44 |
| WO | WO-2018042766 | A1 * | 3/2018 | .......... G06F 21/575 |

* cited by examiner

ENCRYPTION AND/OR DECRYPTION KEY DEVICE, SYSTEM AND METHOD

BACKGROUND

Technical Field

The present disclosure generally concerns electronic circuits and systems and, more particularly, the protection of the data contained and/or processed by the circuits and devices.

The present disclosure more particularly applies to the use of an encryption key for data protection, and in particular for the protection of data stored in a non-volatile memory.

Description of the Related Art

There exist many techniques enabling to protect data used by electronic devices. Encryption techniques, such as data encryption, are particularly used for this purpose.

Data encryption is an operation by which usable and readable data are transformed, by means of a code, into data which can only be read by people or machines knowing the code. The code generally uses an encryption and/or decryption key.

An encryption and/or decryption key may take different forms: a word or a sentence, a combination of instructions, a binary word, etc. The generation of an encryption and/or decryption key may be a decisive point of data protection.

BRIEF SUMMARY

An embodiment facilitates addressing all or part of the disadvantages of known data encryption techniques.

An embodiment provides a method of generation of an ephemeral encryption and/or decryption key by application of a function to a code stored in a non-volatile memory.

According to an embodiment, the ephemeral encryption and/or decryption key is stored in a register.

According to an embodiment, the non-volatile memory is a ROM-type memory.

According to an embodiment, the function is a non-reversible function.

According to an embodiment, the ephemeral encryption and/or decryption key is generated at each booting.

According to an embodiment, the ephemeral encryption and/or decryption key is generated for each critical data processing.

According to an embodiment, the ephemeral encryption and/or decryption key is used to encryption and/or decryption at least part of the data of the non-volatile memory.

According to an embodiment, said code is transferred into a volatile memory before the application of said function.

Another embodiment provides an executable product-program comprising instructions which, when they are executed by a processing unit, implement the above-described method.

Another embodiment provides an electronic device capable of implementing a function configured to generate an ephemeral encryption and/or decryption key from a code stored in a non-volatile memory.

According to an embodiment, the ephemeral encryption and/or decryption key is stored in a register.

According to an embodiment, the non-volatile memory is a ROM-type memory.

According to an embodiment, the function is a non-reversible function.

According to an embodiment, the device further comprises a coding and decoding circuit capable of using the ephemeral encryption and/or decryption key According to an embodiment, the device is capable of generating a plurality of ephemeral encryption keys, each ephemeral encryption and/or decryption key enabling to encryption and/or to decryption a different memory portion.

In an embodiment, a method comprises: applying a function to code stored in a non-volatile memory, generating an ephemeral cryptographic key; and performing one or more cryptographic operations on data using the generated ephemeral cryptographic key. In an embodiment, the method comprises temporarily storing the ephemeral cryptographic key in a register. In an embodiment, the non-volatile memory is a ROM-type memory. In an embodiment, the function is a non-reversible function. In an embodiment, the method comprises generating the ephemeral cryptographic key in a boot process. In an embodiment, the method comprises generating the ephemeral cryptographic key in response to initiation of a critical data process. In an embodiment, the method comprises performing a cryptographic operation on data of the non-volatile memory using the ephemeral cryptographic key. In an embodiment, the method comprises transferring the code into a volatile memory before applying the function. In an embodiment, the code is a portion of a boot code. In an embodiment, the method comprises erasing the ephemeral cryptographic key. In an embodiment, the method comprises performing an authentication process based on results of the cryptographic operation.

In an embodiment, an electronic device comprises: processing circuitry; one or more memories including a non-volatile memory; ephemeral cryptographic key generation circuitry, which, in operation, applies a function to code stored in the non-volatile memory, generating an ephemeral cryptographic key; and cryptographic circuitry coupled between the processing circuitry and the one or more memories, wherein the cryptographic circuitry, in operation, performs one or more cryptographic operations on data using the generated ephemeral cryptographic key. In an embodiment, the device comprises a register, which, in operation, temporarily stores the generated ephemeral cryptographic key. In an embodiment, the non-volatile memory is a ROM-type memory. In an embodiment, the function is a non-reversible function. In an embodiment, the ephemeral cryptographic key generating circuitry generates a plurality of ephemeral cryptographic keys, each generated ephemeral cryptographic key corresponding to a different portion of memory. In an embodiment, the ephemeral cryptographic key generating circuitry generates the ephemeral cryptographic key in response to a boot process. In an embodiment, the ephemeral cryptographic key generating circuitry generates the ephemeral cryptographic key in response to initiation of a critical data process.

In an embodiment, a system comprises one or more memories including a non-volatile memory; and processing circuitry coupled to the one or more memories, wherein the processing circuitry, in operation, applies a function to code stored in the non-volatile memory, generating an ephemeral cryptographic key; and performs one or more cryptographic operations on data using the generated ephemeral cryptographic key. In an embodiment, the system comprises functional circuitry coupled to the processing circuitry, wherein the functional circuitry, in operation, performs one or more operations based on a result of the one or more cryptographic operations. In an embodiment, the code is a portion of a system boot code.

In an embodiment, a non-transitory computer-readable medium's contents configure a computing device to perform a method, the method comprising: applying a function to code stored in a non-volatile memory, generating an ephemeral cryptographic key; and performing one or more cryptographic operations on data using the generated ephemeral cryptographic key. In an embodiment, the contents comprise instructions stored in the non-volatile memory. In an embodiment, the function is a non-reversible function.

The foregoing and other features and advantages of various embodiments will be discussed in detail in the following non-limiting description of specific embodiments in connection with the accompanying drawings.

DETAILED DESCRIPTION

Figure 1:
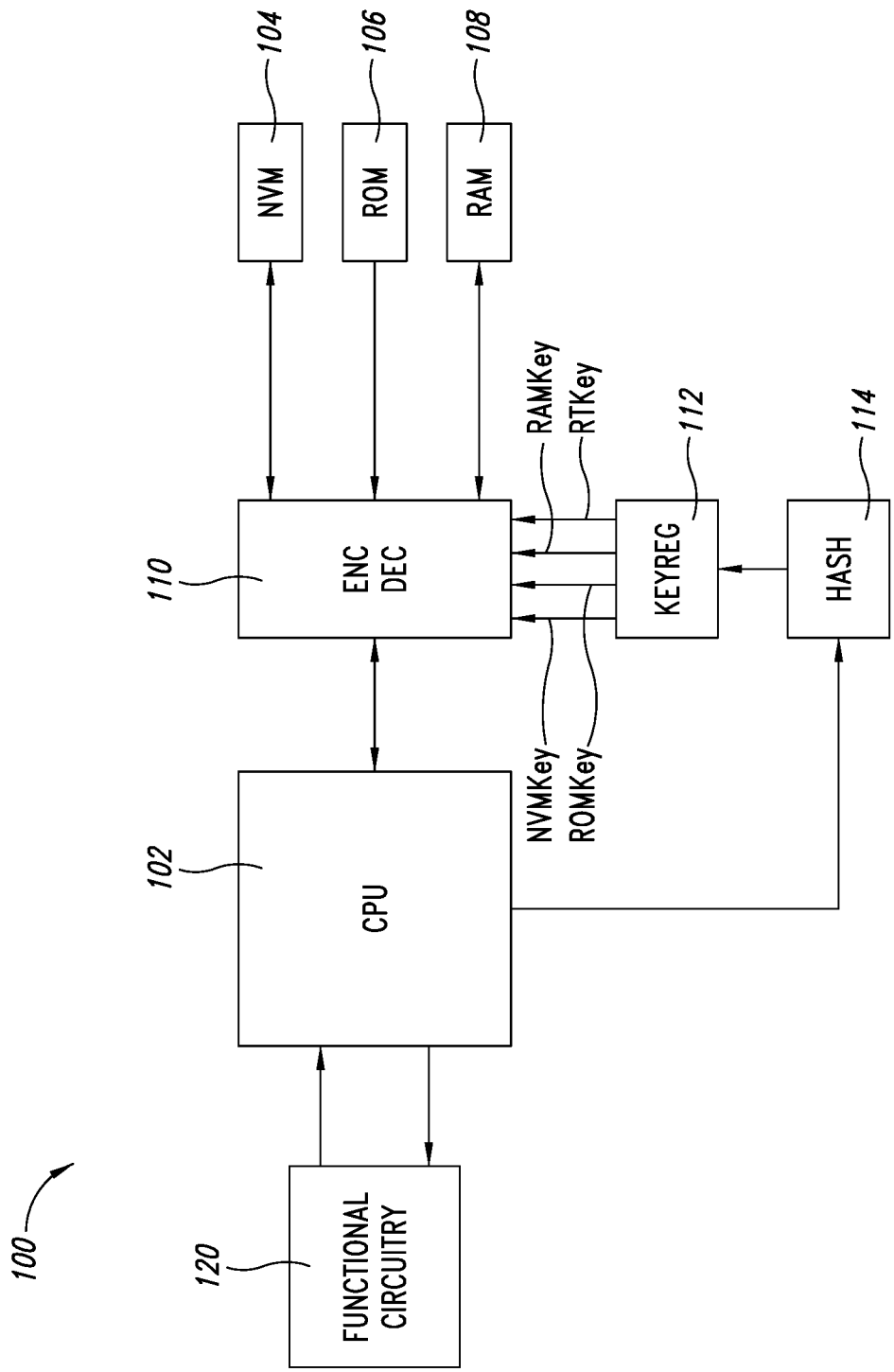
FIG. 1 schematically shows in the form of blocks an embodiment of an electronic device.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed.

Further, the complete encryption algorithms using encryption and/or decryption keys will not be detailed, the described embodiments applying to usual algorithms.

The detail of different uses of electronic devices to which the described embodiments apply (e.g., smart phones, NFC devices, such as transponders, printer cartridges, set-top-boxes, etc.) will not be detailed either.

Throughout the present disclosure, the term "connected" is used to designate a direct electrical connection between circuit elements with no intermediate elements other than conductors, whereas the term "coupled" is used to designate an electrical connection between circuit elements that may be direct, or may be via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

The terms "about", "approximately", "substantially", and "in the order of" are used herein to designate a tolerance of plus or minus 10%, preferably of plus or minus 5%, of the value in question.

FIG. 1 schematically shows in the form of blocks an embodiment of an electronic device 100. In practice, device 100 may be an integrated circuit, an electronic device, a computer, etc.

Device 100 is equipped with at least one processor 102 (CPU) capable of processing data stored in memories. Device 100 further comprises at least one non-volatile memory 104 (NVM), at least one ROM-type non-rewritable memory 106 (ROM), and at least one RAM-type volatile memory 108 (RAM). Non-volatile memory 104 stores, for example, useful data during a plurality of consecutive uses, which should be stored during phases when device 100 is powered off. Non-rewritable memory 106 stores, for example, data useful for the booting of device 100. Volatile memory 108 stores, for example, data useful during the operation of device 100. According to an embodiment, device 100 may comprise no ROM-type non-rewritable memory.

All or part of the data contained in memories 104, 106, and 108 may be ciphered by means of a code using an encryption and/or decryption key. In order for processor 102 to be able to use these data, device 100 is equipped with cryptographic circuit 110 (ENC DEC). More particularly, circuit 110 enables to decrypt the data originating from memories 104, 106, and 108 in order to transfer them to processor 102, and circuit 110 further enables to encrypt the data originating from processor 102 in order to transfer them to memories 104 and 108. In other words, circuit 110 is an intermediate cryptographic circuit coupling processor 102 to memories 104, 106, and 108.

Cryptographic circuit 110 further receives as an input encryption and/or decryption keys NVMKey, ROMKey, RAMKey, and RTKey enabling to encrypt and/or to decrypt the data of device 100. Encryption and/or decryption keys NVMKey, ROMKey, RAMKey enable to encryption and/or to decryption, respectively, all or part of the data of memories 104, 106, and 108. Key RTKey is an ephemeral or volatile encryption and/or decryption key which is only volatilely stored, that is, it disappears each time device 100 is powered off. Key RTKey enables to encryption and/or to decryption all or part of the data of memories 104 and 108. The use of ephemeral key RTKey and the method of generating this key will be detailed in relation with FIG. 2.

According to an embodiment, keys NVMKey, ROMKey, RAMKey, and RTKey are symmetrical encryption keys. According to another embodiment, keys NVMKey, ROMKey, RAMKey, and RTKey are asymmetrical encryption keys.

To temporarily store keys NVMKey, ROMKey, RAMKey, and RTKey, device 100 is equipped with one or a plurality of registers 112 (KEYREG). The register receives keys NVMKey, ROMKey, and RAMKey from the memories where they are stored, for example, memories 104 or 106. As a variation (not shown), keys NVMKey, ROMKey, and RAMKey may be stored by physical coding in logic circuits of the device. Register 112 receives ephemeral key RTKey from a processing unit or key generating circuit 114 (HASH). According to an embodiment, key RTKey is stored at least in register 112 and possibly also in volatile memory 108.

Processing unit or ephemeral cryptographic key generating circuitry 114 is for example a processor capable of implementing a function enabling to generate ephemeral key RTKey from at least one piece of data, preferably a plurality of data, supplied by processor 102. The function is for example a non-reversible function, for example, a signature function, a hash function, or a CRC-type function (Cyclic Redundancy Check). The data supplied by processing circuit 102 may be, for example, a code portion stored in a non-volatile memory, for example memory 104 or memory 106. The primary function of this code portion is, for example, independent from its use to generate ephemeral key RTKey. As an example, the code portion is for example a portion of a boot code stored in non-rewritable memory 106. According to an alternative embodiment, the code portion may be transferred into a volatile memory, for example, memory 108, before being executed by processor 102.

As illustrated, the device 100 comprises one or more functional circuits 120, such as a receiver, a transmitter, a transceiver, MEMS circuitry, authentication circuitry, etc., and various combinations thereof, which may perform one or more operations based on results of cryptographic operations performed by the cryptographic circuitry.

Embodiments of the device 100 may comprise more or fewer elements than illustrated, may combine illustrated elements together, may split illustrated elements into additional illustrated elements, and various combinations thereof. For example, in an embodiment the device 100 may comprise an interface to couple the device to other devices. In another example, in some embodiments the ephemeral cryptographic key generating circuitry may be combined with another circuit of the device, such as the processor 102 or the cryptographic circuitry 110.

Figure 2:
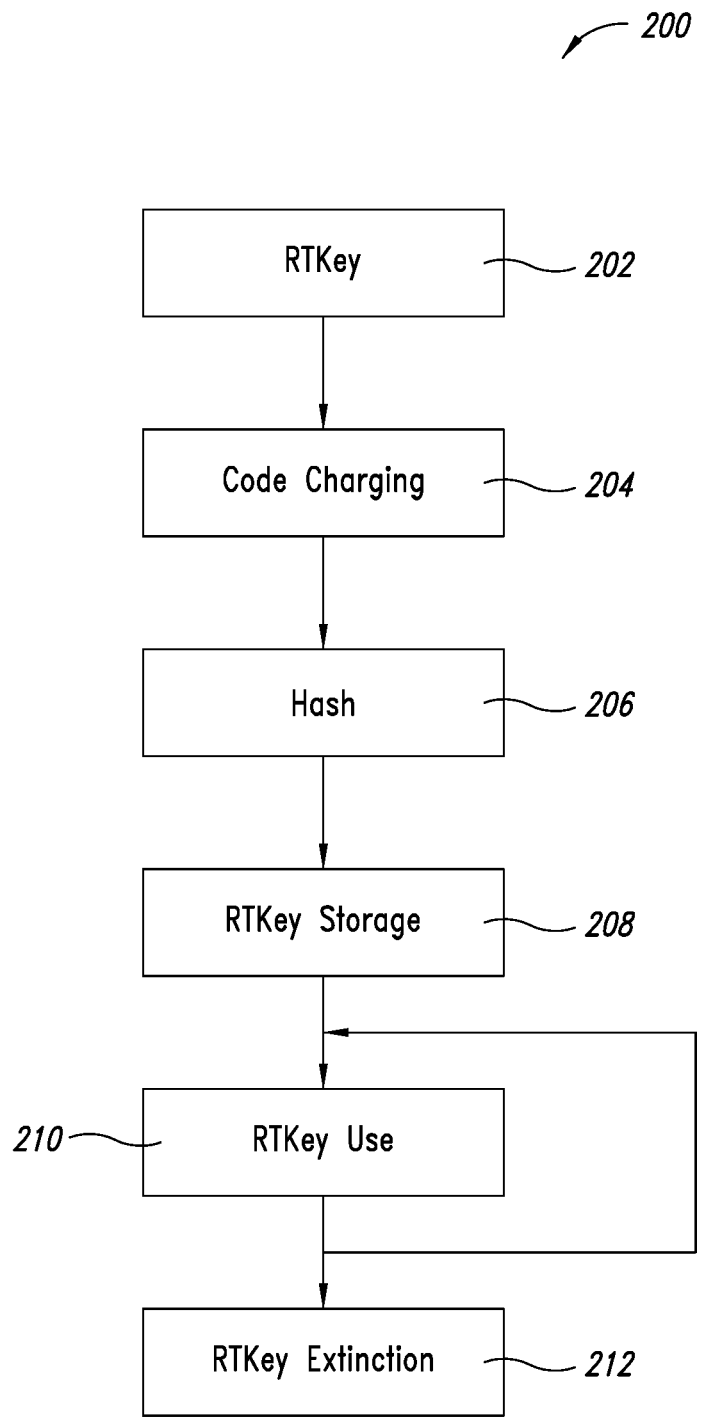
FIG. 2 shows a flowchart illustrating an implementation mode of a key generation method.

The operation of device 100 will be detailed in relation with FIG. 2.

FIG. 2 shows a flowchart illustrating an implementation mode of a method 200 of generation of ephemeral key RTKey by device 100.

At a step 202 (RTKey Command), device 100 is about to process potentially critical data which require being ciphered and/or deciphered. Device 100 informs processor 102 thereof by sending thereto a control signal for the generation of ephemeral key RTKey. According to an embodiment, this step may occur at each booting of device 100 if all the data stored in memories 104, 106, and 108 and processed by processor 102 are critical. According to an alternative embodiment, this step may occur each time the critical data are about to be processed by processor 102. In an embodiment, an RTKey Command may be issued periodically, or after a threshold number of uses of the RTKey.

At a step 204 (Code Charging), processor 102 recovers the code portion stored in one of the non-volatile memories, for example memory 104 or memory 106, enabling to generate key RTKey. The code portion is decrypted, if need be with key ROMKEy or NVMKey according to cases, by coding and decoding circuit 110, and then transmitted by processor 102 to processing unit 114. As a reminder, the code portion is for example a portion of a boot code stored in non-rewritable memory 106.

At a step 206 (Hash), processing unit 114 implements the function enabling to generate ephemeral key RTKey from the code portion sent by processor 102. The function is for example a signature function, for example a hash function.

At a step 208 (RTKey Storage), processing unit 114 transfers ephemeral encryption key RTKey to register 112 so that it is stored therein. Register 112 further enables to store keys NVMKey, ROMKey, and RAMKey.

At a step 210 (RTKey Use), register 112 supplies keys NVMKey, ROMKey, RAMKey, and RTKey to coding and decoding circuit 110, which uses them to encrypt and/or decrypt data. More particularly, circuit 110 uses key RTKey to encrypt and/or decrypt all or part of the data of non-volatile memory 104. Key RTKey may be used as many times as necessary during the powering on of device 100.

At a step 212 (RTKey Extinction), ephemeral key RTKey disappears, for example, by the powering off of device 100 or is destroyed via a control signal sent, for example, by processor 102 (e.g., periodically, after a threshold number of uses, after the processing for which the RTKey was generated have completed, etc.).

An advantage of this embodiment is that it facilitates avoiding certain types of attack where an electronic device processor is configured by a pirate to operate, for example, so that it delivers the data contained in memories 104, 106, and 108. By using an ephemeral key of the type of key RTKey, the reconfigured processor can only supply data decryption with a key which is not accessible by a pirate. Indeed, since the key is only stored in volatile fashion, it will not be accessible any longer after the reconfiguration of the processor.

Various embodiments and variations have been described. It will be understood by those skilled in the art that certain features of these various embodiments and variations may be combined, and other variations will occur to those skilled in the art. In particular, although the description details the use of a single ephemeral key, the use of a plurality of ephemeral keys by a same electronic device may be provided, where each key may for example protect all or part of the data of one of the memories.

Further, according to a variation, it is possible for device 100 to comprise no non-rewritable memory 106, which would then be replaced with a non-volatile memory, for example, with non-volatile memory 104. The non-rewritable memory 106 may be an EEPROM.

Finally, the practical implementation of the described embodiments and variations is within the abilities of those skilled in the art based on the functional indications given hereabove.

Such alterations, modifications, and improvements are intended to be part of this disclosure, and are intended to be within the spirit and the scope of the present disclosure. Accordingly, the foregoing description is by way of example only and is not intended to be limiting.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, convolutional accelerators, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
decrypting an encrypted code stored in a non-rewritable, non-volatile memory, the decrypting of the encrypted code generating a decrypted code;
booting an electronic device using the decrypted code;
generating an ephemeral cryptographic key by applying a non-reversible function to data, the data to which the non-reversible function is applied including a portion of the decrypted code used to boot the electronic device, wherein the decrypted code is transferred into a volatile memory before applying the non-reversible function; and
performing one or more cryptographic operations using the generated ephemeral cryptographic key.

2. The method of claim 1, comprising temporarily storing the ephemeral cryptographic key in a register.

3. The method of claim 1, wherein the non-reversible function is:
a signature function;
a hash function; or
a Cyclic Redundancy Check (CRC) function.

4. The method of claim 1, comprising generating the ephemeral cryptographic key during the booting of the electronic device.

5. The method of claim 1, comprising generating the ephemeral cryptographic key in response to initiation of a data process.

6. The method of claim 1, wherein the performing one or more cryptographic operations comprises performing a cryptographic operation on data of the non-volatile memory using the ephemeral cryptographic key.

7. The method of claim 1, wherein the volatile memory is a RAM memory.

8. The method of claim 1, wherein the generating the ephemeral cryptographic key comprises storing the ephemeral cryptographic key, and the method further comprises erasing the stored ephemeral cryptographic key.

9. The method of claim 1, comprising performing an authentication process based on results of the one or more cryptographic operations.

10. A system, comprising:
one or more memories including a non-rewriteable, non-volatile memory; and
processing circuitry coupled to the one or more memories, wherein the processing circuitry, in operation,
decrypts encrypted boot code stored in the non-rewritable, non-volatile memory, the decrypting the encrypted boot code generating decrypted boot code;
executes a boot operation using the decrypted boot code;
generates an ephemeral cryptographic key by applying a non-reversible function to data, the data to which the non-reversible function is applied including a portion of the decrypted boot code used to execute the boot operation, wherein the decrypted boot code is transferred into a volatile memory before applying the non-reversible function; and
performs one or more cryptographic operations using the generated ephemeral cryptographic key.

11. The system of claim 10, comprising functional circuitry coupled to the processing circuitry, wherein the functional circuitry, in operation, performs one or more operations based on a result of the one or more cryptographic operations.

12. The system of claim 10, wherein the boot code is a system boot code.

13. A non-transitory computer-readable medium having contents which configure a computing device to perform a method, the method comprising:
decrypting encrypted boot code stored in a non-rewritable, non-volatile memory, the decrypting the encrypted boot code generating decrypted boot code;
executing a boot operation using the decrypted boot code;
generating an ephemeral cryptographic key by applying a non-reversible function to data, the data to which the non-reversible function is applied including a portion of the decrypted boot code used to execute the boot operation, wherein the decrypted boot code is transferred into a volatile memory before applying the non-reversible function; and
performing one or more cryptographic operations using the generated ephemeral cryptographic key.

14. The non-transitory computer-readable medium of claim 13, wherein the contents comprise instructions stored in the non-transitory computer-readable medium.

15. The non-transitory computer-readable medium of claim 13, wherein the non-reversible function is:
a signature function;
a hash function; or
a Cyclic Redundancy Check (CRC).

* * * * *

UNITED STATES PATENT AND TRADEMARK OFFICE
CERTIFICATE OF CORRECTION

| | | |
|---|---|---|
| PATENT NO. | : 12,362,922 B2 | Page 1 of 1 |
| APPLICATION NO. | : 16/824242 | |
| DATED | : July 15, 2025 | |
| INVENTOR(S) | : Fabrice Marinet et al. | |

It is certified that error appears in the above-identified patent and that said Letters Patent is hereby corrected as shown below:

In the Claims

<u>Column 7, Claim 10, Line 48:</u>
"non-rewriteable,"
Should read:
-- non-rewritable, --.

Signed and Sealed this
Sixteenth Day of September, 2025

Coke Morgan Stewart
*Acting Director of the United States Patent and Trademark Office*